(12) United States Patent
Kirsch

(10) Patent No.: US 7,149,875 B2
(45) Date of Patent: Dec. 12, 2006

(54) DATA REORDERING PROCESSOR AND METHOD FOR USE IN AN ACTIVE MEMORY DEVICE

(75) Inventor: Graham Kirsch, Tadley (GB)

(73) Assignee: Micron Technology, Inc., Boise, ID (US)

( * ) Notice: Subject to any disclaimer, the term of this patent is extended or adjusted under 35 U.S.C. 154(b) by 497 days.

(21) Appl. No.: 10/629,378

(22) Filed: Jul. 28, 2003

(65) Prior Publication Data

US 2004/0193839 A1    Sep. 30, 2004

(30) Foreign Application Priority Data

Mar. 27, 2003  (GB)  ................................. 0307086.9

(51) Int. Cl.
*G06F 12/00*    (2006.01)
*G06F 15/80*    (2006.01)

(52) U.S. Cl. ........................................................ 712/10
(58) Field of Classification Search .................... 712/4, 712/10; 707/7
See application file for complete search history.

(56) References Cited

U.S. PATENT DOCUMENTS

| | | | |
|---|---|---|---|
| 4,825,361 A | 4/1989 | Omoda et al. | .............. 364/200 |
| 5,043,935 A | 8/1991 | Taniai et al. | ................. 364/900 |
| 5,107,415 A | 4/1992 | Sato et al. | ................... 395/800 |
| 5,247,695 A * | 9/1993 | Kashiyama et al. | ........... 712/6 |
| 5,396,641 A * | 3/1995 | Iobst et al. | .................. 713/100 |
| 5,822,606 A * | 10/1998 | Morton | ........................ 712/16 |
| 6,226,738 B1 * | 5/2001 | Dowling | ..................... 712/225 |
| 6,266,758 B1 * | 7/2001 | van Hook et al. | .............. 712/2 |
| 6,295,597 B1 * | 9/2001 | Resnick et al. | ................. 712/8 |
| 6,813,701 B1 * | 11/2004 | Ansari | ........................... 712/4 |

* cited by examiner

*Primary Examiner*—Eric Coleman
(74) *Attorney, Agent, or Firm*—Dorsey & Whitney, LLP

(57) ABSTRACT

An active memory device includes a command engine that receives high level tasks from a host and generates corresponding sets of either DCU commands to a DRAM control unit or ACU commands to a processing array control unit. The DCU commands include memory addresses, which are also generated by the command engine, and the ACU command include instruction memory addresses corresponding to an address in an array control unit where processing array instructions are stored. The active memory device includes a vector processing and re-ordering system coupled to the array control unit and the memory device. The vector processing and re-ordering system re-orders data received from the memory device into a vector of contiguous data, process the data in accordance with an instruction received from the array control unit to provide results data, and passes the results data to the memory device.

24 Claims, 3 Drawing Sheets

DATA REORDERING PROCESSOR AND METHOD FOR USE IN AN ACTIVE MEMORY DEVICE

TECHNICAL FIELD

The invention relates memory devices, and, more particularly, to a system and method for reordering data for more efficient processing in an active memory device.

BACKGROUND OF THE INVENTION

A common computer processing task involves sequentially processing large numbers of data items, such as data corresponding to each of a large number of pixels in an array. Processing data in this manner normally requires fetching each item of data from a memory device, performing a mathematical or logical calculation on that data, and then returning the processed data to the memory device. Performing such processing tasks at high speed is greatly facilitated by a high data bandwidth between the processor and the memory devices. The data bandwidth between a processor and a memory device is proportional to the width of a data path between the processor and the memory device and the frequency at which the data are clocked between the processor and the memory device. Therefore, increasing either of these parameters will increase the data bandwidth between the processor and memory device, and hence the rate at which data can be processed.

A memory device having its own processing resource is known as an active memory. Conventional active memory devices have been provided for mainframe computers in the form of discrete memory devices having dedicated processing resources. However, it is now possible to fabricate a memory device, particularly a dynamic random access memory ("DRAM") device, and one or more processors on a single integrated circuit chip. Single chip active memories have several advantageous properties. First, the data path between the DRAM device and the processor can be made very wide to provide a high data bandwidth between the DRAM device and the processor. In contrast, the data path between a discrete DRAM device and a processor is normally limited by constraints on the size of external data buses. Further, because the DRAM device and the processor are on the same chip, the speed at which data can be clocked between the DRAM device and the processor can be relatively high, which also maximizes data bandwidth. The cost of an active memory fabricated on a single chip can is also less than the cost of a discrete memory device coupled to an external processor.

An active memory device can be designed to operate at a very high speed by parallel processing data using a large number of processing elements ("PEs") each of which processes a respective group of the data bits. One type of parallel processor is known as a single instruction, multiple data ("SIMD") processor. In a SIMD processor, each of a large number of PEs simultaneously receive the same instructions, but they each process separate data. The instructions are generally provided to the PE's by a suitable device, such as a microprocessor. The advantages of SIMD processing are simple control, efficient use of available data bandwidth, and minimal logic hardware overhead. The number of PE's included on a single chip active memory can be very large, thereby resulting in a massively parallel processor capable of processing large amounts of data.

Active memory devices, particularly active memory devices using SIMD PEs, are very efficient at processing data in a regular, uniform manner. For example, 2D image convolution is ideally suited to an active memory device using SIMD PEs because the same operation is performed in every pixel of the image, although the data corresponding to each pixel may, of course, vary. Furthermore, the same address is used throughout the system, data is stored in a regular fashion, and the data to be processed, as well as the data resulting from the processing, can easily be read from and written to the DRAM in contiguous groups having a size that can be processed by the PEs. However, active memory devices using SIMD PEs loose there efficiency when they are called upon to process irregular data, such as data corresponding to widely spaced pixels in an image. In such case, it is generally necessary to mask the data resulting from the processing of data for the pixels for which processing is not desired. The processing of the masked data is therefore wasted, thereby markedly reducing the processing efficiency of the active memory device.

There is therefore a need for a system and method for allowing an active memory device using SIMD PEs to achieve its normal efficiency when processing regular, uniform data without loosing that efficiency when called upon to process irregular, sparsely populated data.

SUMMARY OF THE INVENTION

An integrated circuit active memory device and method includes a vector processing and re-ordering system that is operable to receive data from an internal storage device that may be stored in other than a contiguous manner. The data received from the storage device is re-ordered into a vector of contiguous data, and this re-ordered data are then processed to provide results data. The results data are then passed to the storage device, although the results data may be re-ordered before being passed to the storage device.

DETAILED DESCRIPTION OF THE INVENTION

Figure 1:
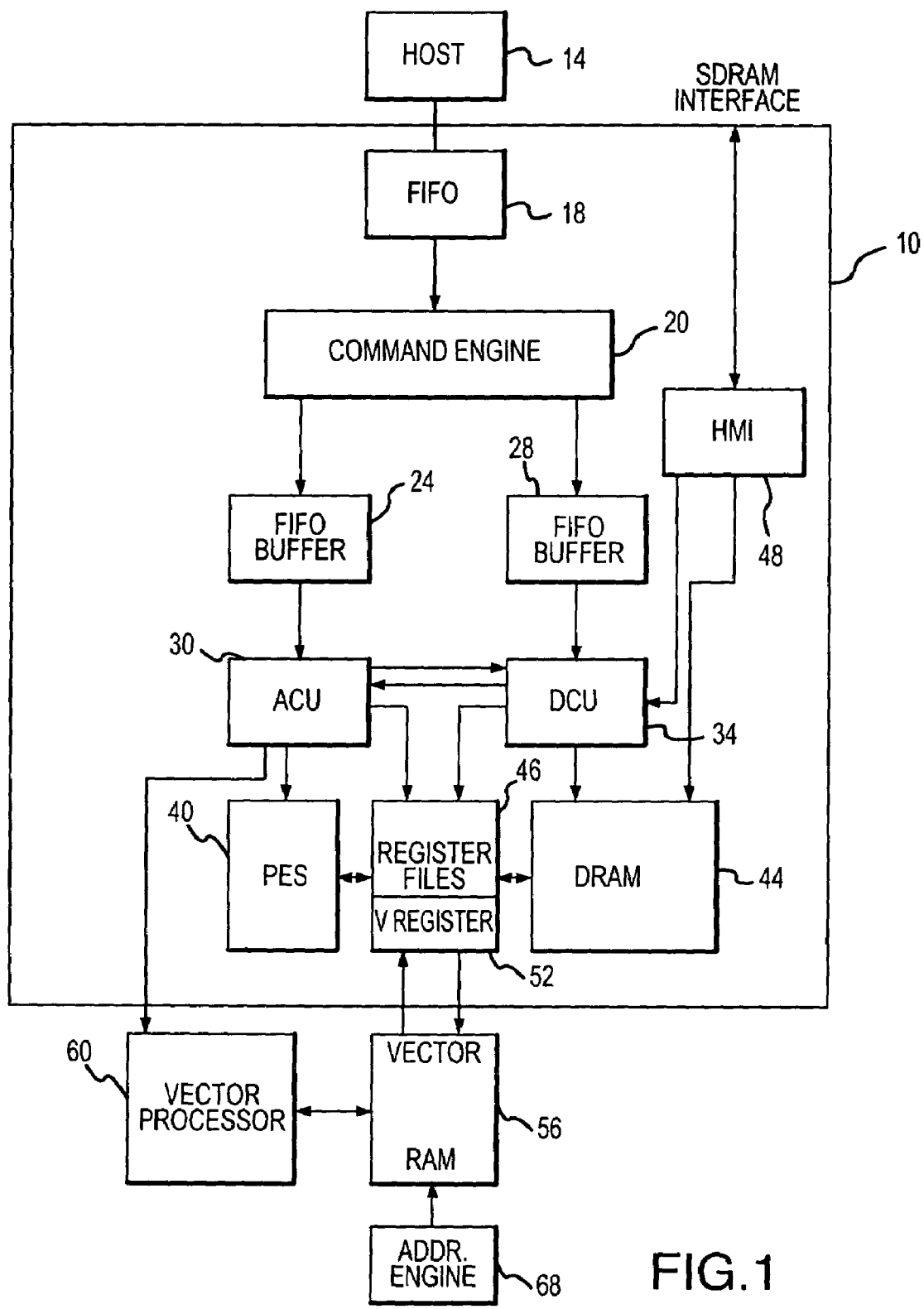
FIG. 1 is a block diagram of an active memory device according to one embodiment of the invention.

FIG. 1 shows an active memory device 10 according to one embodiment of the invention. The memory device 10 is coupled to a host 14, such as a microprocessor, although it may be coupled to other devices that supply high level instructions to the memory device 10. The memory device 10 includes a first in, first out ("FIFO") buffer 18 that receives high level tasks from the host 14. Each task includes a task command and may include a task address. The received task commands are buffered by the FIFO buffer 18 and passed to a command engine 20 at the proper time and in the order in which they are received. The command engine 20 generates respective sequences of commands corresponding to received task commands. These commands are at a lower level than the task commands received by the command engine 20. The commands are coupled from the command engine 20 to either a first FIFO buffer 24 or a second FIFO buffer 28 depending upon whether the commands are array processing commands or memory commands. If the commands are array processing commands, they are passed to the FIFO buffer 24 and then to a processing array control unit ("ACU") 30. If the commands are memory commands, they are passed to the FIFO buffer 28 and then to a DRAM Control Unit ("DCU") 34.

The ACU 30 executes an intrinsic routine containing several microinstructions responsive to each command from the FIFO buffer 24, and these microinstructions are executed by an array of PEs 40. The PE's operate as SIMD processors in which all of the PEs 40 receive and simultaneously execute the same instructions, but they do so on different data or operands. In the embodiment shown in FIG. 1, there are 256 PE's 40 each of which is coupled to receive 8 bits of data from the DRAM 44 through register files 46. In the embodiment shown in FIG. 1, the DRAM 44 stores 16M bytes of data. However, it should be understood that the number of PEs used in the active memory device 10 can be greater or lesser than 256, and the storage capacity of the DRAM 44 can be greater or lesser than 16 Mbytes.

Different intrinsic routines containing different microinstructions are issued by the ACU 30 for different commands received from the FIFO buffer 24. The DCU 34 issues memory commands and addresses responsive to commands from the FIFO buffer 34. In response, data are either read from a DRAM 44 and transferred to the register files 46, or written to the DRAM 44 from the register files 46. The register files 46 are also available to the PE's 40. The ACU 30 and the DCU 34 are coupled to each other so the operation of each of them can be synchronized to the other. The ACU 30 and DCU 34 are also coupled directly to the register files 46 so that they can control the operation and timing of data transfers between the register files 46 and both the PEs 40 and the DRAM 44.

With further reference to FIG. 1, the DRAM 44 may also be accessed by the host 14 directly through a host/memory interface ("HMI") port 48. The HMI port 48 receives commands that are substantially similar to the commands received by a conventional SDRAM except that signals for performing a "handshaking" function with the host 14 may also be provided. These commands include, for example, ACTIVE, DEACTIVATE, READ, WRITE, etc. In the embodiment shown in FIG. 1, the HMI port 48 includes a 32-bit data bus and a 14-bit address bus, which is capable of addressing 16,384 pages of 256 words. The address mapping mode is configurable to allow data to be accessed as 8, 16 or 32 bit words.

In a typical processing task, data read from the DRAM 44 are stored in the register files 46. The data stored in the register files 46 are then transferred to the PEs 40 where they become one or more operands for processing by the PEs 40. Groups of data bits read from or written to each set of DRAM columns are processed by respective PEs 40. The data resulting from the processing are then transferred from the PEs 40 and stored in the register files 46. Finally, the results data stored in the register files 46 are written to the DRAM 44.

The PEs 40 operate in synchronism with a processor clock signal (not shown in FIG. 1). The number of processor clock cycles required to perform a task will depend upon the nature of the task and the number of operands that must be fetched and then stored to complete the task. In the embodiment of FIG. 1, DRAM operations, such as writing data to and reading data from the DRAM 44, requires about 16 processor clock cycles. Therefore, for example, if a task requires transferring three operands into and of the DRAM 44, the task will require a minimum of 48 cycles.

As mentioned above, active memory devices using SIMD PEs are relatively inefficient in processing irregularly ordered data. To allow the active memory device 10 to retain its efficiency when processing irregularly ordered data, the active memory device 10 includes a re-ordering and vector processing system 50 that efficiently processes irregularly ordered data. The re-ordering and vector processing system 50 includes vector registers ("V registers") 52 that can store vectors, which are arrays of data, coupled to or from the DRAM 44. Basically, the V registers 52 act as a direct memory channel much like the HMI port 48 to receive data from the DRAM 44 that is to be processed, and to transmit data resulting from the processing back to the DRAM 44. Data movement between the V registers 52 and the DRAM 44 is controlled by the DCU 34, which preferably schedules transfer bursts when data are not being transferred between the DRAM 44 and either the registers files 46 or the HMI port 48. Data transferred from the DRAM 44 to the V registers 52 are shifted out of the registers 52 into a vector RAM 56, which is, in turn, coupled to a vector processor 60. After the data has been processed by the vector processor 60, the processed data are stored in the V registers 52 and then transferred to the DRAM 44 during an available time period scheduled by the DCU 34. To facilitate data transfer with the V-registers 52 and vector processor 60, the vector RAM 56 is preferably a dual port RAM. The vector RAM 56 can also be used by the vector processor 60 as working memory.

Before being processed by the vector processor 60, the irregularly ordered data are reordered into a regular set of data. The regularly ordered results data are then re-ordered back to the original order before being stored in the DRAM 44. For example, if every $6^{th}$ pixel in an image were to be processed, the data corresponding to these pixels would be reordered so that only the data for these pixels is transferred to the vector processor 60. After the vector processor 60 processes the data, the resulting regularly ordered data are reordered to correspond to their original order (i.e., every $6^{th}$ pixel) and stored in the DRAM 44 in that order. As explained in greater detail below, this reordering is accomplished by selectively controlling the address sequence applied to the vector RAM 56 as data are shifted into or out of the RAM 56. The address sequence is generated by an addressing engine 68, which may be implemented, for example, by a RAM-based look up table. The addressing engine 68 need not simultaneously generate addresses for all of the location in the vector RAM 56. Instead, the addressing engine 68 only needs to generate addresses for the amount of data stored in the V registers 52.

The vector processor 60 is a vectored re-ordering processor in which an exchange unit (not shown in FIG. 1) is capable of moving any byte of an input vector to any byte of an output vector. Like the PEs 40, the vector processor 60 receives instructions from the ACU 30 that are part of an intrinsic routine corresponding to a command passed to the ACU 30 by the command engine. Operations performed by the vector processor 60 include byte shifts in either direction, single byte accesses using a scalar register as an index, memory operations and a vector-indexed exchange or hash operation. In the hash operation, the vector processor 60 uses one vector as an index vector for an exchange operation on the bytes of another vector. The first vector is accumulated, and each byte of the accumulated vector determines which byte of a vector read from the V registers 52 will be stored in the corresponding byte of the result of the processing. The instruction set for the vector processor 60 will be provided below.

Figure 2:
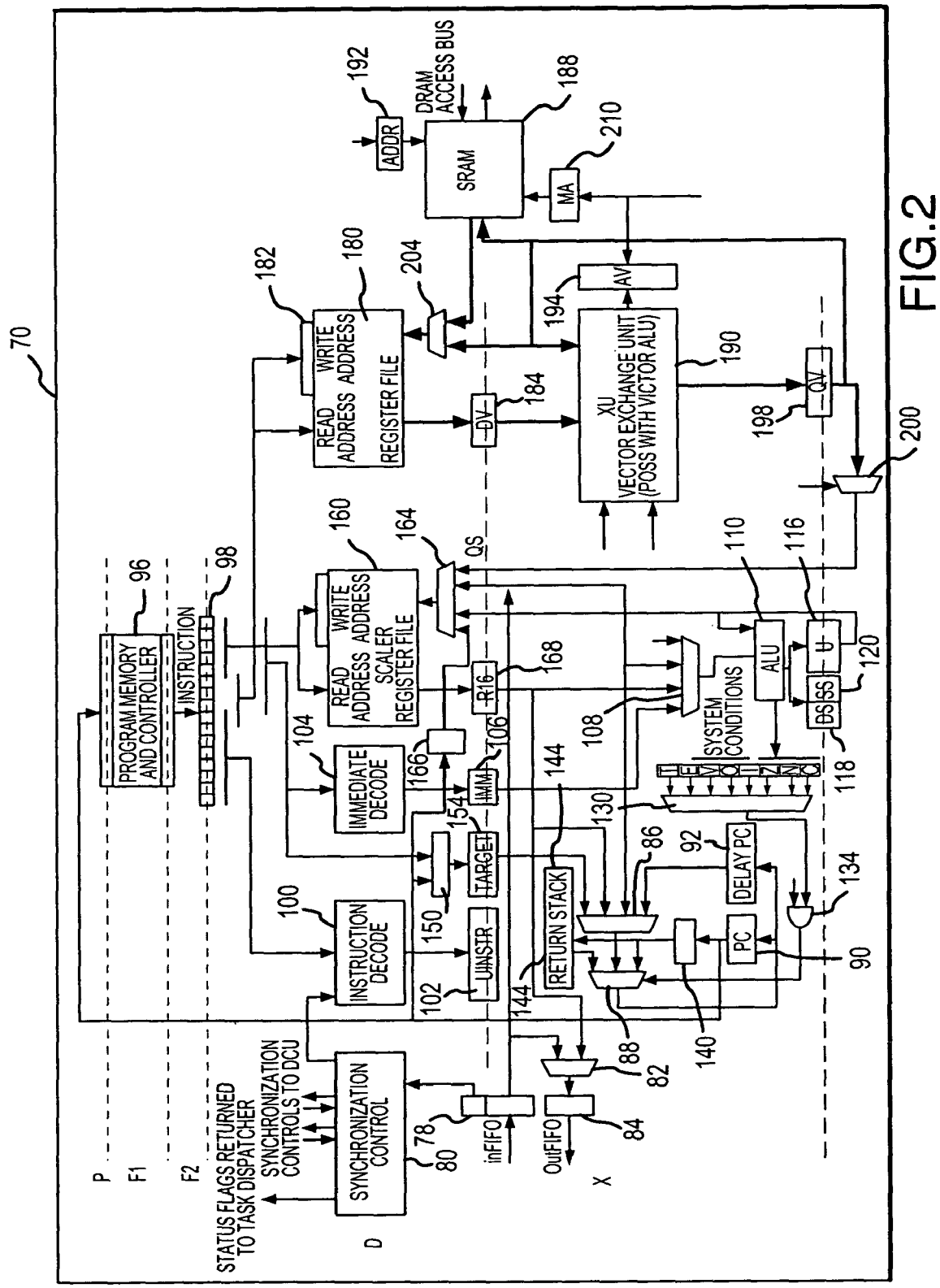
FIG. 2 is a block diagram of one embodiment of a vector processor that can be used in the active memory of FIG. 1 or an active memory device according to some other embodiment of the invention.

One embodiment of a vector processor 70 that may be used as the vector processor 60 in the active memory device 10 of FIG. 1 is shown in FIG. 2. The instructions from the ACU 30 are applied to an input FIFO buffer 78. The output of the FIFO buffer 78 is coupled to a synchronization control unit 80 and to a control input of a multiplexer 82. If the received instruction corresponds to an instruction to pass data back to the host ACU 30, the multiplexer 82 is enabled to pass the output data to an output FIFO buffer 84. The synchronization control unit 80 also receives signals from the DCU 34 to control the timing of the vector processor 70 in initiating data transfers between the V registers 52 and the DRAM 44. The synchronization control unit 80 can also pass status information back to the DCU 34.

If the instruction from the ACU 30 is a jump instruction, in which instructions are to be executed starting from a jump address, the jump address is coupled through a first multiplexer 86 and a second multiplexer 88 to set a program counter 90 and a delayed program counter 92 to the jump address. The jump address is then used to address a Program Memory and Controller 96, which outputs a microinstruction stored at the jump address to an instruction register 98. The Program Memory and Controller 96 is normally loaded prior to operation with different sets of microinstructions depending upon the instructions will be passed to the vector processor 70.

A portion of the microinstruction stored in the instruction register 98 is decoded by a microinstruction decoder 100, which outputs a corresponding microinstruction to a microinstruction register 102. The microinstructions control the internal operation of the vector processor 70, such as the FIFO buffers, multiplexers, etc. The signal paths from the microinstruction register 102 are numerous, and, in the interest of clarity, have been omitted from FIG. 2 The microinstructions used to control the operation of the vector processor 70 are shown in Table 1:

TABLE 1

| Group | Mnemonic | Operation | Opcode | Comment |
|---|---|---|---|---|
| 0 | Control Instructions | | | |
| | NOP | PC = PC + 1 | 0000 0000 0000 0000 | Still does array Instruction! |
| | ALERT | | 0000 0001 0000 0000 | Send alert (Interrupt) to host. |
| | NULL2 | | 0000 1110 0000 00001 | Inhibit decode of next two M16 and array instructions, build unencoded array microinstruction. |
| | WAITSYS | | 0000 1111 0000 0000 | Wait for data in FIFO and branch |
| | Flag Operations | | | |
| | SETE | E <= 1 | 0000 0010 0000 0000 | Set E flag. |
| | CLRE | E <= 0 | 0000 0011 0000 0000 | Clear E flag |
| | SETEV | E <= V | 0000 0100 0000 0000 | Move V to E |
| | SEGCV | C <= V | 0000 0101 0000 0000 | Move V to C |
| 0 | Shifts | | | |
| | RL | C = U(15), U = (U << 1, C) | 0000 0110 0000 0000 | Rotate left through carry |
| | RR | C = U(0), U = (C, U >> 1) | 0000 0111 0000 0000 | Rotate right through carry |
| | Bit Operations | | | |
| | BITS | U = U1(0x8000 >> b) | 0000 1000 0000 bbbb | Bit set |
| | BITC | U = U&(0x8000 >> b) | 0000 1001 0000 bbbb | Bit clear |
| | BITT | Z = ((U&(0x8000 >> b)) == 0) | 0000 1010 0000 bbbb | Bit test => Z |
| 1 | Relative Branch | | | |
| | BRR cond? @ BRR + #i | PC = cond? @ BRR + 3 + #i | 0001 cccc iiii iiii | Relative branch |
| 2 | Precalculated Branch | | | |
| | BR cond? reg | PC = cond? reg | 0010 cccc 000r rrrr | Precalculated target in register pair. |
| 3 | Arithmetic and Logical | | | |
| | ADD reg | U, S2V = U + R | 0011 Usm1 000r rrrr | |
| | ADDC reg | U, S2V = U + R + C | 0011 Usm1 001r rrrr | |
| | SUB reg | U, S2V = U − R | | |
| | SUBC reg | U, S2V = U − R + C | | |
| | AND reg | U, S2V = U&R | | |
| | OR reg | U, S2V = U/R | | |

TABLE 1-continued

| Group | Mnemonic | Operation | Opcode | Comment |
|---|---|---|---|---|
|  | XOR reg | U, S2V = U^R |  |  |
|  | <spare> reg | U, S2V = U?R |  |  |
| 4 | Immediate Add |  |  |  |
|  | ADD #imm | U, S2V = U + #i | 0100 USM1 iiii iiii | #i is sign extended to 16 bits (Can also use to do S2V <= U) |
| 5, 6 | Immediates |  |  |  |
| 5 | IMME n | U, S2V = decoded(N) | 0101 Usm1 nnnn nnnn | See Table 2-3 for encoding of N |
| 6 | IMM k | U, S2V = {#k, #k} | 0110 Usm1 kkkk kkkk | K is copied to both bytes |
| 7 | Moves |  |  |  |
|  | MOVR reg {u, s2v} | U, S2V = R etc. | 0111 Usm1 x00r rrrr | U is modified if U is 1. S2V is modified if S is 1. LS byte is modified if 1 is 1, MS byte is modified if m is 1. Bytes are exchanged if X is 1. Replaces all MOVR, SWAP and MERGE, MOVRL, MOVRH instructions. |
| 8 | MOVU reg | R = U | 1000 0000 000r rrrr |  |
|  |  |  | 1000 0001 000r rrrr | Unused, reserved |
|  |  |  | 1000 0010 000r rrrr | Unused, reserved |
|  | MOVPC reg | R = PC | 1000 0011 000r rrrr | Loads reg with @ MOVPC + 6 |
|  | MOVV_R reg | R = DV @ SS | 1000 010v vvvr rrrr | vvvv is vector register file address |
| 9 | MOVS reg {u, s2v} | R (U, S2V) = inF | 1001 Usm1 000r rrrr | Load register directly from in FIFO. U is modified if U is 1. S2V is modified if S is 1. RF reg is always modified. |
|  | MOVU_S | outF = U | 1001 0000 1000 0000 | (Mnemonic is MOVU) |
|  | MOVR_S reg | outF = R | 1001 0000 010r rrrr | (Mnemonic is MOVR) |

The instructions shown in Group 0 are used for basic control of the vector processor 70 and to set and clear various flags and bits. The instructions in Groups 7–9 are used to move data and addresses into and out of various registers and components. The instructions in the remaining groups will be discussed below.

In addition to the instructions decoded by the microinstruction decoder 100, an instruction may be alternatively be preceded by an immediate instruction, which are shown in Groups 4–6 of Table 1. For example, an Immediate Add instruction shown in Group 4 of Table 1 indicates that a data value having more than 16 bits is to be added to the contents of the U register 116. The immediate instruction is decoded by an immediate instruction decoder 104 and the command data in the instruction is stored in an IMM register 106. The data stored in the IMM register 106 is combined with the data in the subsequent instruction decoded by the instruction decoder 100 and stored in the microinstruction register 102. The combined data fields are then passed through a multiplexer 108 to an arithmetic and logic unit ("ALU") 110. The ALU 100 performs an arithmetic or logical operation on the data, and outputs the results to either a U register 116, a data scalar ("DS") register 118, or a select scalar ("SS") register 120. The data stored in the DS register 118 corresponds to a data vector containing a several elements, and the data stored in the SS register 120 is used to select elements from the vector stored in the DS register 118. These operations, and the instructions that correspond to them, are shown in Table 3, which is explained below.

The ALU 100 also provides several conditional values, one of which is selected by a multiplexer 130 for conditional branching of the program in accordance with the instructions shown in Groups 1 and 2 of Table 1. These conditions are shown in Table 2 as follows:

TABLE 2

| Code | Flag | Comment | Code | Flag | Comment |
|---|---|---|---|---|---|
| 0 | Always | Always true | 8 | Never | Always false |
| 1 | C | ALU Carry out | 9 | NC | !ALU carry out |
| 2 | N | ALU result < 0 | A | NN | ALU result > 0 |
| 3 | Z | ALU result = 0 | B | NZ | ALU result ! = 0 |
| 4 | IFE | Input FIFO empty | C | NIFE | Input FIFO not empty |
| 5 | OFF | Output FIFO full | D | NOFF | Output FIFO not full |
| 6 | V | Vector condition true | E | NV | Vector condition false |
| 7 | E | Program set condition | F | NE | E not set |

A signal indicative of a branch conditioned on the variable selected by the multiplexer 130 is coupled to a gate 134, which is enabled by an active BRANCH microinstruction, to cause the multiplexer 130 to couple the jump address from the input FIFO buffer 78 to the program counters 90, 92, as previously explained. The ALU 100 may also output a return stack of instructions to be stored in the U register 116 for subsequently restoring the program to a location prior to a branch.

Assuming there is no branch to a jump address, the count from the program counter 90 is incremented by an adder 140 to provide an incremented instruction count that is stored in a return stack register 144 and is coupled through the multiplexers 86, 88 to write the incremented count to the program counter 90. The program count is also coupled to an adder 150 that can also receive an offset address forming part of the instruction from the microinstruction register 98. The adder offsets the program address by a predetermined magnitude to generate a target address that is stored in a target address register 154. This target address is coupled through the multiplexers 86, 88 to write the target address to the program counter 90. The program counter 90 then addresses the Program Memory and Controller 96 at a location corresponding to the target address.

The vector processor 70 also includes a scalar register file 160 that is addressed by a portion of the instructions from the instruction register 98. The register file 160 receives write data through a multiplexer 164 from various sources, most of which have been previously described. In particular the register file 160 serves as scratch memory for the vector processor 70. In addition to the data previously described, the register file 160 can also store a future program instruction address by incrementing the current program address from the program counter 90 using an adder 166, thereby storing a program address that is two instructions beyond the current instruction. Data read from the scalar register file 160 is temporarily stored in an R16 register 168, where it is available at various locations. For example, the data from the register 168 may be passed though the multiplexer 82 to the output FIFO buffer output FIFO buffer 84, which then outputs the data to the ACU 30 (FIG. 1). The data from the R16 register 168 is also used by the ALU 90 to perform various operations in connection with data from the U register 116, as shown in Group 3 of Table 1.

A portion of the instruction from the instruction register 98 includes either a read address or a write address that are passed to two different ports of a vector register file 180. In the case of a write address, the address is buffered by an input FIFO buffer 182. Data vectors are either read from the read address of the register file 180 and passed to a data vector ("DV") register 184, or transferred from a dual-ported SRAM 188 and written to the register file 180 at the write address. The data vectors stored in the DV register 184 are subsequently transferred to a vector exchange unit ("XU") 190, which also receives the scalar data from the DS register 118, and the element selection data from the SS register 120. The operating of the exchange unit 190 is, in part, controlled by signals from an activity control ("AV") register 194, which is loaded with data from the R 16 register 168. The XU 190 performs various functions pursuant to instructions from the Program Memory and Controller 96, which will be described below. Vectors processed by the XU 190 are stored in a QV register 198. The QV register 198, in turn, outputs the vectors to either of two locations. First, the vectors may be written to the SRAM 188 for subsequent transfer to the DRAM 44. Second, elements of the vector are selected by a multiplexer 200, which is controlled by the element selection data from the SS register 120, and passed through the multiplexer 164 to the scalar register file 160.

The SRAM 188 acts as an interface with the DRAM 44, and it is addressed for transfers to the DRAM 44 by an address unit 192, which is, in turn, controlled by the DCU 34. For transfers to the vector register file 180 through a multiplexer 204 or from the QV register 198, the SRAM 188 is addressed by an address stored in a memory address ("MA") register 210, which is loaded with an address from the R16 register 168.

The set of instructions stored in the Program Memory and Controller 96 that control the operation of the XU 190 is shown in the following Table 3:

TABLE 3

| Group | Mnemonic | Operation | Opcode | Comment |
|---|---|---|---|---|
| A | Activity Vector Loads and Shifts | | | |
| | MOVU_AV | (AV.ms, AV.1s) = U | 1010 10m1 0000 0000 | Load activity vector register from U |
| | V_SHL | AV = (AV << 1)&z | 1010 010z 0000 0000 | Shift activity vector register left |
| | CLR_AV | (AV.ms, AV.1s) = 0 | 1010 00m1 0000 0000 | Clear activity vector register |
| | INV_AV | (AV.ms, AV1s) = −1 | 1010 11m1 0000 0000 | Invert activity vector register |
| B | Activity Vector Load from Vector | | | |
| | V_LDA | AV <= V.bit | 1011 000v vvv0 bbbb | |
| C | Moves into QV, including hash and shift operations | | | |
| | V_MOVD | AV?QV <= DV | 1100 A00v vvv0 0000 | If A is 1, activity controlled |
| | V_HASH | AV?QV <= DV#QV | 1100 A01v vvv0 0000 | Hash function: QV addresses elements of DV. If A is 1, activity controlled. |
| | V_SHR | AV?QV <= shr QV | 1100 A100 0000 0000 | QV(i) = (A&AV(i))?QV(i + 1): |
| | V_SHL | AV?QV <= shl QV | 1100 A110 0000 0000 | QV(i) = (A&AV(i))?QV(i − 1): QV(i) |

TABLE 3-continued

| Group | Mnemonic | Operation | Opcode | Comment |
|---|---|---|---|---|
| D | Vector File Loads | | | |
| | VF_LDS | AV?V @ SS <= DS | 1101 A00v vvv0 0000 0000 | Load single byte in vector. SS selects byte. DS is new data. |
| | VF_LDV | AV?V <= QV | 1101 A01v vvv0 0000 | Return QV to vector file. |
| E | Reserved Codes for Vector Arithmetic | | | |
| | VOP8 | AV?QV <= DV op8 QV | 1110 A00v vvvf ffff | 8 bit vector operation (ffff is opcode) |
| | | AV?QV <= DV op16 QV | 1110 A01v vvvf ffff | 16 bit vector operation |
| | | AV?QV <= DV op32 QV | 1110 A10v vvvf ffff | 32 bit vector operation |
| | | AV?QV <= DV flop QV | 1110 A11v vvvf ffff | Floating point vector operation |
| F | Memory Operations | | | |
| | V_LOAD | AV?V <= *R | 1111 A00v vvvr rrrr | Load vector from memory |
| | V_LOADP | AV?V <= *R++ | 1111 A01v vvvr rrrr | Pipeline load from memory (post-increment scalar register) |
| | V_STORE | *R <= QV | 1111 A100v 000r rrrr | Store vector in memory |
| | V_STOREP | *R++ <= QV <= DV | 1111 A11v vvvr rrrr | Pipeline store to memory (load through QV and post increment scalar register) |

The instructions in Group A operate on the control data stored in the AV register 194 to load or clear the register 194, shift the data stored therein in either direction, or invert the data stored therein.

The instructions in Groups B–E are concerned with vector operations. In particular, the $V_{13}$ LDA instruction in Group B loads the AV register 194 from the selected bit of each addressed vector element. The variable V is the vector address, and the variable B is the bit select. The instructions in Group C perform moves into the QV register 198. The variable AV? Indicates activity control, and the QV register 198 is loaded only when AV is equal to 1. The variable DV is the source vector stored in the DV register 184 from the vector register file 180. The instruction V_MOVD is a straightforward copy of the of the contents of the DV register 184 into the QV register 198 under control of the AV variable stored in the AV register 194 as described above. The entire vector stored in the QV register 198 can be shifted right or left by the V_SHR and VSHL instructions, respectively. Finally, the V_HASH instruction uses the values stored in the QV register 198 to select each element in the vector output from the XU register 190. For example, if QV(5)=24 in the V_HASH instruction, the fifth value in the QV register 198, i.e., QV(5), will be set equal to the $24^{th}$ value in the DV register 184, i.e, DV(24). In this manner, the XU 190 acts as a data re-ordering subsystem of the vector processor 70 to re-order irregularly stored data for more efficient processing by the remainder of the vector processor 70, which acts as a processing sub-system.

The instructions in Group D are used to load data into the vector register file 180. The instruction VF_LDS loads a single byte stored in the DS register 118 that is selected by the select data stored in the SS register 120. On the other hand, the V_LDV instruction loads the entire contents of the DS register 118 into the vector register file 180. However, the vector register file 180 is loaded only if the AV value stored in the AV register 194 is equal to 1.

Finally, the instructions in Group F are used to write data to and read data from the SRAM 188. The memory address for both writes and reads is provided by the MA register 210, as previously explained. Included are instructions to load data from the SRAM 188 into the vector register file 180 in both pipelined and non-pipelined manners, and two instructions to store data in the SRAM 188 from the QV register 198 in both pipelined and non-pipelined manners. As explained above data is transferred between the SRAM 188 and the DRAM 44 by the DCU 34 operating through the address unit 192.

The vector processor 70 explained with reference to FIG. 2 is thus able to re-order data from the DRAM 44, efficiently process the re-order data, and then return data resulting from the processing to its original order for storage in the DRAM 44. As a result, the inherent efficiency of the active memory device 10 using SIMD PE's 40 is preserved even though the active memory device 10 is processing non-contiguously or even irregularly stored data.

Figure 3:
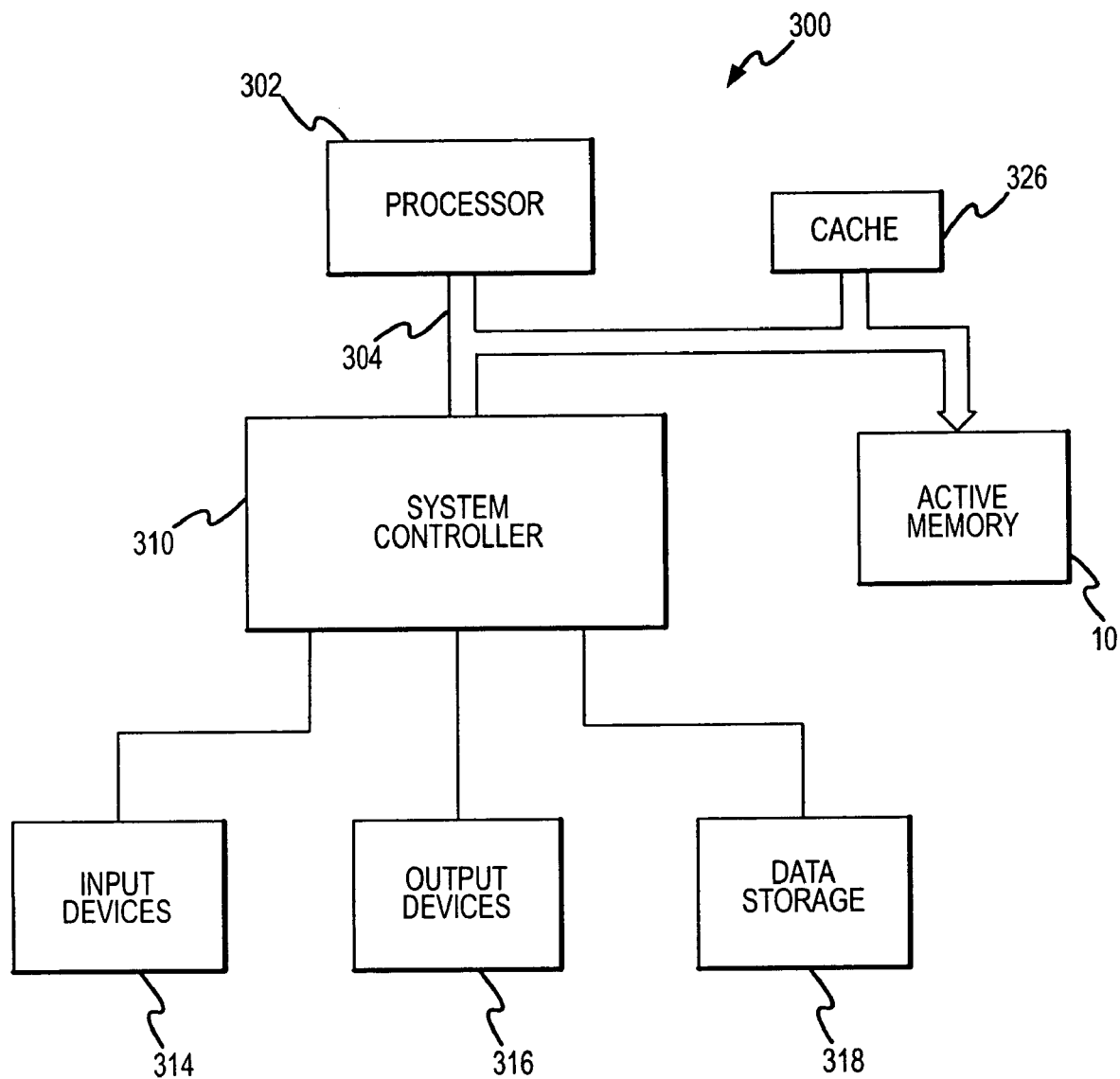
FIG. 3 is a block diagram of a computer system using the active memory device of FIG. 1 according to one embodiment of the invention.

A computer system 300 using the active memory device 10 of FIG. 1 or some other active memory device according to the present invention is shown in FIG. 3. The computer system 300 includes a processor 302 for performing various computing functions, such as executing specific software to perform specific calculations or tasks. The processor 302 includes a processor bus 304 that normally includes an address bus, a control bus, and a data bus. In addition, the computer system 300 includes one or more input devices 314, such as a keyboard or a mouse, coupled to the processor 302 through a system controller 310 to allow an operator to interface with the computer system 300. Typically, the computer system 300 also includes one or more output devices 316 coupled to the processor 302 through the system controller 310, such output devices typically being a printer or a video terminal. One or more data storage devices 318 are also typically coupled to the processor 302 through the system controller 310 to store data or retrieve data from external storage media (not shown). Examples of typical storage devices 318 include hard and floppy disks, tape cassettes, and compact disk read-only memories (CD-ROMs). The processor 302 is also typically coupled to a cache memory 326, which is usually static random access memory ("SRAM"). The processor 302 is also coupled through the data bus of the processor bus 304 to the active memory device 10 so that the processor 302 can act as a host 14, as explained above with reference to FIG. 1.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. An integrated circuit active memory device comprising:
   a memory device having a data bus containing a plurality of data bus bits;
   an array of processing elements each of which is coupled to a respective group of the data bus bits, each of the processing elements having an instruction input coupled to receive processing element instructions for controlling the operation of the processing elements;
   an array control unit being operable to generate a sequence of array control unit instructions responsive to each of a plurality of array control unit commands applied to a command input of the array control unit;
   a memory device control unit coupled to the memory device, the memory device control unit being operable to generate and to couple respective sets of memory commands to the memory device responsive to each of a plurality of memory device control unit commands applied to a command input of the memory device control unit;
   a command engine coupled to the array control unit and the memory device control unit, the command engine being operable to couple to the array control unit respective sets of the array control unit commands and to couple to the memory device control unit respective sets of the memory device control unit commands responsive to respective task commands applied to a task command input of the command engine; and
   a vector processing and re-ordering system coupled to the array control unit and the memory device, the vector processing and re-ordering system being operable to receive data from the memory device that may be stored in the memory device in other than a contiguous manner, re-order received data into a vector of contiguous data, process the data in accordance with an instruction received from the array control unit to provide results data, and pass the results data to the memory device.

2. The active memory device of claim 1 wherein the memory device comprises a dynamic random access memory device.

3. The active memory device of claim 1, wherein the vector processor comprises:
   a processing subsystem having a program memory storing a plurality of instructions, a command input coupled to the array control unit to receive the instruction from the array control unit, a data input operable to receive data to be processed, a data output operable to output processed data, and a processing unit coupled to the program memory, the data input and the data output, the processing unit being operable to process the data received at the data input in accordance with instructions stored in the program memory selected by an instruction received from the array control unit and to output the processed data to the data output; and
   a data re-ordering subsystem operable to receive the data from the memory device, re-order received data into a vector of contiguous data, and couple the re-ordered data to the processing system, the data re-ordering system further being operable to and pass the results data to the memory device.

4. The active memory device of claim 3 wherein the data re-ordering system comprises an exchange unit that receives instructions from the array control unit to re-order the data from the memory device in accordance with the instructions.

5. The active memory device of claim 4 further comprising a multiplexer coupled to receive data from the exchange unit, the multiplexer receiving a select signal that selects corresponding portions of the data received from the exchange unit.

6. The active memory device of claim 3 wherein the data re-ordering subsystem is further operable to re-order the results data prior to passing the results data to the memory device.

7. The active memory device of claim 1 wherein the vector processing and re-ordering system comprises:
   a vector register coupled to receive data from the memory device and to transmit data to the memory device;
   a vector memory coupled to the vector register to store data transferred from the vector register and to pass data stored in the vector memory to the vector register; and
   a vector processor coupled to the vector memory to receive data from the vector memory for processing and to pass results data to the vector memory.

8. The active memory device of claim 7, further comprising an addressing engine coupled to the vector memory, the addressing engine being operable to control the locations in which data are stored in the vector memory.

9. The active memory device of claim 8 wherein the addressing engine is operable to selectively control an address sequence applied to the vector memory as data are coupled to or from the vector memory to re-order the data coupled to or from the vector memory.

10. The active memory device of claim 7 wherein the vector memory comprises a dual-ported memory, one of the ports of the vector memory being coupled to the vector register and the other of the ports of the vector memory being coupled to the vector processor.

11. The active memory device of claim 7 wherein the vector memory comprises a random access memory.

12. The active memory device of claim 7 wherein the vector processor comprises:
   an arithmetic and logic unit; and
   a register coupled to receive and store data resulting from an arithmetic or logical operation performed by the arithmetic and logic unit.

13. A computer system, comprising:
   a host processor having a processor bus;
   at least one input device coupled to the host processor through the processor bus;
   at least one output device coupled to the host processor through the processor bus;
   at least one data storage device coupled to the host processor through the processor bus; and
   an active memory device, comprising:
      a memory device having a data bus containing a plurality of data bus bits;

an array of processing elements each of which is coupled to a respective group of the data bus bits, each of the processing elements having an instruction input coupled to receive processing element instructions for controlling the operation of the processing elements;

an array control unit being operable to generate a sequence of array control unit instructions responsive to each of a plurality of array control unit commands applied to a command input of the array control unit;

a memory device control unit coupled to the memory device, the memory device control unit being operable to generate and to couple respective sets of memory commands to the memory device responsive to each of a plurality of memory device control unit commands applied to a command input of the memory device control unit;

a command engine coupled to the host processor, the array control unit and the memory device control unit, the command engine being operable to couple to the array control unit respective sets of the array control unit commands and to couple to the memory device control unit respective sets of the memory device control unit commands responsive to respective task commands from the host processor; and a vector processing and re-ordering system coupled to the array control unit and the memory device, the vector processing and re-ordering system being operable to receive data from the memory device that may be stored in the memory device in other than a contiguous manner, re-order received data into a vector of contiguous data, process the data in accordance with an instruction received from the array control unit to provide results data, and pass the results data to the memory device.

14. The computer system of claim 13 wherein the memory device comprises a dynamic random access memory device.

15. The computer system of claim 13, wherein the vector processor comprises:

a processing subsystem having a program memory storing a plurality of instructions, a command input coupled to the array control unit to receive the instruction from the array control unit, a data input operable to receive data to be processed, a data output operable to output processed data, and a processing unit coupled to the program memory, the data input and the data output, the processing unit being operable to process the data received at the data input in accordance with instructions stored in the program memory selected by an instruction received from the array control unit and to output the processed data to the data output; and a data re-ordering subsystem operable to receive the data from the memory device, re-order received data into a vector of contiguous data, and couple the re-ordered data to the processing system, the data re-ordering system further being operable to and pass the results data to the memory device.

16. The computer system of claim 15 wherein the data re-ordering system comprises an exchange unit that receives instructions from the array control unit to re-order the data from the memory device in accordance with the instructions.

17. The computer system of claim 16, further comprising a multiplexer coupled to receive data from the exchange unit, the multiplexer receiving a select signal that selects corresponding portions of the data received from the exchange unit.

18. The computer system of claim 15 wherein the data re-ordering subsystem is further operable to re-order the results data prior to passing the results data to the memory device.

19. The computer system of claim 13 wherein the vector processing and re-ordering system comprises:

a vector register coupled to receive data from the memory device and to transmit data to the memory device;

a vector memory coupled to the vector register to store data transferred from the vector register and to pass data stored in the vector memory to the vector register; and a vector processor coupled to the vector memory to receive data from the vector memory for processing and to pass results data to the vector memory.

20. The computer system of claim 19, further comprising an addressing engine coupled to the vector memory, the addressing engine being operable to control the locations in which data are stored in the vector memory.

21. The computer system of claim 20 wherein the addressing engine is operable to selectively control an address sequence applied to the vector memory as data are coupled to or from the vector memory to re-order the data coupled to or from the vector memory.

22. The computer system of claim 19 wherein the vector memory comprises a dual-ported memory, one of the ports of the vector memory being coupled to the vector register and the other of the ports of the vector memory being coupled to the vector processor.

23. The computer system of claim 19 wherein the vector memory comprises a random access memory.

24. The computer system of claim 19 wherein the vector processor comprises:

an arithmetic and logic unit; and a register coupled to receive and store data resulting from an arithmetic or logical operation performed by the arithmetic and logic unit.

* * * * *